E. H. BENEDICT.
GIG-SAW.
No. 174,105.        Patented Feb. 29, 1876.
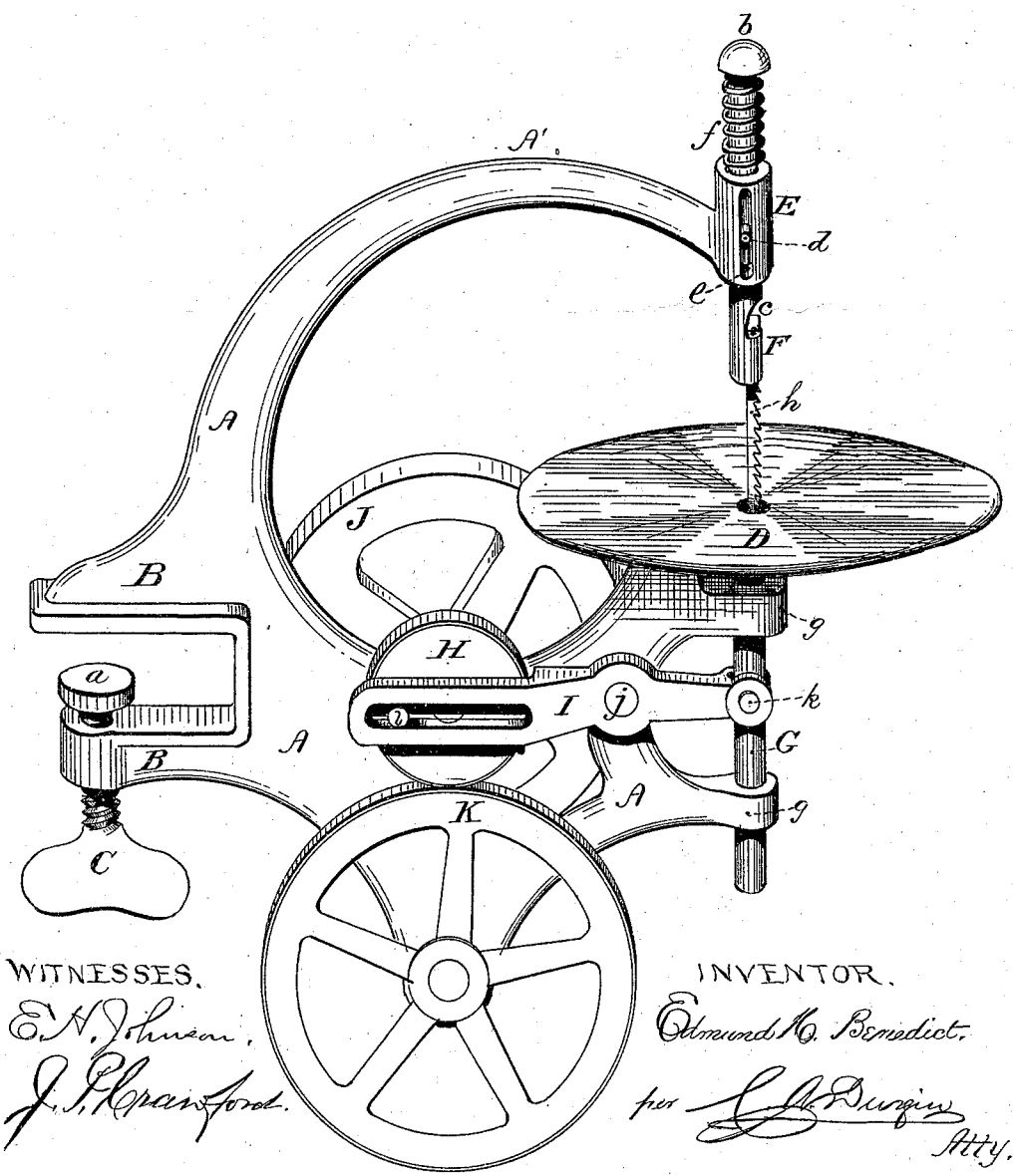

UNITED STATES PATENT OFFICE.

EDMUND H. BENEDICT, OF NEW YORK, ASSIGNOR OF ONE-HALF HIS RIGHT TO GEORGE H. CLARKE, OF BROOKLYN, N. Y.

IMPROVEMENT IN JIG-SAWS.

Specification forming part of Letters Patent No. 174,105, dated February 29, 1876; application filed August 18, 1875.

*To all whom it may concern:*

Be it known that I, EDMUND H. BENEDICT, of the city, county, and State of New York, have invented certain Improvements in Jig-Saws, of which the following is a specification:

My invention relates to jig-saws; and consists in a novel construction, combination, and arrangement of parts; and it has for its object to produce a machine simple in construction and easy and steady in operation, which is in itself portable, and which may be with facility secured to any table, bench, or other support by being clamped thereto, as will be fully hereafter set forth.

The drawing is a perspective view of my machine.

A is the frame, corresponding in shape very nearly to the letter G. B B are jaws cast on the rear of the frame. C is a clamping-screw passing through the lower jaw, and provided with a head, *a*. D is the table of the machine for supporting the work. It is circular, may be of any suitable or desired material, and is provided with a central hole, through which the saw passes. The arm A' of the frame, which overhangs the table D, has at its extremity a sleeve, E, which is immediately over the center of the table. Through this sleeve or guide passes the rod F, which is provided with a head, *b*, at its upper extremity, and is niched at *c*, as shown. A pin, *d*, projecting from this rod enters the slot *e* in the sleeve, thus preventing the rod from turning in the sleeve. A spring, *f*, is interposed between the head *b* of the rod and the sleeve E, which has a tendency to keep the rod raised. The frame immediately under the table D is formed into guides *g g*, in which reciprocates the rod G. This rod has a niche at its upper extremity similar to the niche *c* on the rod F. The niched ends of both rods are split to admit the extremities of the saw *h*. A pin, *i*, on each extremity of the saw catches into the niches on the ends of the rods when the extremities of the saw are inserted into the slots in the ends of the rods. H is a disk secured to a short shaft journaled in the frame. I is a lever pivoted to the frame at *j*, and pin-jointed at one extremity to the rod G at *k*, so that as it oscillates this rod receives a reciprocating motion. The other extremity of this lever is slotted, as shown, and into the slot a stud, *l*, projecting from the side of the disk H, takes. J is a balance-wheel secured to the shaft of the disk H. K is a frictional driving-wheel. The periphery of this wheel, and if necessary that of the disk also, may be covered with some material—india-rubber, for instance—which will cause friction of the one against the other, it being understood that the peripheries of the wheel and disk are in contact.

The operation of the machine requires but litte explanation. On the wheel K being revolved the disk H in frictional contact therewith receives a rotary motion, and the stud *l* working in the slot in the lever I imparts to this lever an oscillating motion, and thus the rod G, to which the lever is pivoted, is reciprocated, and the saw *h* operated or "jigged" up and down, the spring *f* keeping it distended, and the movement of the stud *l* in the slot continually changing the point at which the power is applied to the lever, and thus creating a variable motion, which is slower and more powerful when the saw is cutting through the stuff in its downward stroke than when the saw is performing its upward stroke.

To overcome or balance the jerk which the spring would give when the stud *l* passed the upper dead center, and to equalize the motion of the parts, a balance-wheel, J, is secured on the shaft of the disk H.

The wheel K may be provided with a crank-handle when it is desired to operate the machine by hand, or it may be driven by means of a treadle.

I claim—

The portable jig-saw machine, herein shown and described, consisting of the frame A with jaws B B and screw C, table D, rods F and G, spring *f*, slotted lever I, disk H, wheel K, and wheel J, constructed and operating substantially in the manner described and specified.

2. The combination of the disk H, slotted lever I, rods G and F, and spring *f*, supported and working on the frame A, substantially in the manner described and specified.

EDMUND H. BENEDICT.

Witnesses:
E. H. JOHNSON,
J. P. CRAWFORD.